(12) United States Patent
O'Neil et al.

(10) Patent No.: US 12,718,465 B2
(45) Date of Patent: Aug. 25, 2026

(54) DOUBLE BUFFERING FOR ACCUMULATED HISTORY

(71) Applicant: Arm Limited, Cambridge (GB)

(72) Inventors: Liam James O'Neil, Bedale (GB); Ridhwanul Haque, Manchester (GB); Yanxiang Wang, Manchester (GB); Carlos Barragán del Rey, Manchester (GB)

(73) Assignee: Arm Limited, Cambridge (GB)

( * ) Notice: Subject to any disclaimer, the term of this patent is extended or adjusted under 35 U.S.C. 154(b) by 236 days.

(21) Appl. No.: 18/459,192

(22) Filed: Aug. 31, 2023

(65) Prior Publication Data

US 2025/0078389 A1 Mar. 6, 2025

(51) Int. Cl.
*G06T 15/06* (2011.01)
*G06T 1/60* (2006.01)
*G06T 15/50* (2011.01)

(52) U.S. Cl.
CPC ................ *G06T 15/06* (2013.01); *G06T 1/60* (2013.01); *G06T 15/503* (2013.01)

(58) Field of Classification Search
CPC ......... G06T 15/06; G06T 1/60; G06T 15/503; G06T 2207/20084; G06T 15/506
See application file for complete search history.

(56) References Cited

U.S. PATENT DOCUMENTS

2005/0168473 A1* 8/2005 Nishi ........................ G06T 1/60 345/643
2010/0309205 A1* 12/2010 Novosad ................ G06T 15/06 345/545
2018/0096516 A1* 4/2018 Luebke .................. G06T 15/06
2025/0106355 A1* 3/2025 Luo ........................ G06T 7/579

OTHER PUBLICATIONS

Application as Filed, U.S. Appl. No. 17/816,655, filed Aug. 1, 2022, 97 pages.
Thomas, et al, "Temporally Stable Real-Time Joint Neural Denoising and Supersampling," Proc. ACM Comput. Graph. Interact. Tech., vol. 5, No. 3, Article 21, Publication date: Jul. 2022, 22 pages.
Schied, et al, "Gradient Estimation for Real-Time Adaptive Temporal Filtering," Proc. ACM Comput. Graph. Interact. Tech., vol. 1, No. 2, Article 24, Publication date: Aug. 2018, 16 pages.

(Continued)

*Primary Examiner* — Said Broome
*Assistant Examiner* — Jordan Wan Yick
(74) *Attorney, Agent, or Firm* — Berkeley Law & Technology Group, LLP

(57) ABSTRACT

Disclosed are process and devices for processing an image frame. An image frame rendered on rendering instances may comprise pixel values for one or more lighting components. One or more first buffers may store accumulations of pixel values for the one or more lighting components over at least some past rendering instances. One or more second buffers may store pixel values for the one or more lighting components of a processed image frame. Pixel values in the one or more first buffers may be combined with pixel values in the one or more second buffers to provide pixel values for the one or more lighting components in an accumulated image frame.

19 Claims, 11 Drawing Sheets

(56) References Cited

OTHER PUBLICATIONS

Wikipedia, "Bilateral filter," Retrieved from https://en.wikipedia.org/w/indexphptitle=Bilateral_filter&oldid=1166529572, Page was last edited on Jul. 23, 2023, 4 pages.
Github, "NVIDIA's implementation of RTX ray-tracing in Quake II," https://github.com/NVIDIA/Q2RTX#readme, Downloaded Aug. 9, 2023, 9 pages.
Cyberpunk, "Phantom Liberty Tour," Home of the Cyberpunk 2077 universe—games, anime & more, https://www.cyberpunk.net/gb/en/, Downloaded Aug. 9, 2023, Date of webpage Jun. 7, 2023, 13 pages.
Intel Open Image Denoise, "High-Performance Denoising Library for Ray Tracing," https://www.openimagedenoise.org, Downloaded Aug. 9, 2023, 6 pages.
Mix—OpenGL 4 Refernces Pages, "mix—linearly interpolate between two values," ,https://registry.khronos.org/OpenGL-Refpages/gl4/html/mix.xhtml, Downloaded Aug. 9, 2023, 3 pages.
Hasselgren, et al, "Neural Temporal Adaptive Sampling and Denoising," https://research.nvidia.com/publication/2020-05_neural-temporal-adaptive-sampling-and-denoising, Published May 25, 2020, 9 pages.
NVIDIA, "NVIDIA OptiX™ AI-Accelerated Denoiser," NVIDIA OptiX™ AI-Accelerated Denoiser, NVIDIA Developer, https://developer.nvidia.com, Downloaded Aug. 9, 2023, 11 pages.
NVIDIA, "NVIDIA Real-Time Denoisers (NRD)," NVIDIA Real-Time Denoisers (NRD), NVIDIA Developer, Home / RTX / Ray Tracing / NVIDIA Real-Time Denoisers (NRD), Downloaded Aug. 9, 2023, 8 pages.
Hasslegren, et al., "Neural Temporal Adaptive Sampling and Denoising—Supplemental material," EUROGRAPHICS 2020 / U. Assarsson and D. Panozzo, vol. 39 (2020), No. 2, https://research.nvidia.com/publication/2020-05_neural-temporal-adaptive-sampling-and-denoising, Published May 25, 2020, 4 pages.
Schied, et al, "Spatiotemporal Variance-Guided Filtering: Real-Time Reconstruction for Path-Traced Global Illumination," Proceedings of HPG '17, http://dx.doi.org/10.1145/3105762.3105770, Jul. 28-30, 2017, 12 pages.
TextureLod—OpenGL 4 References Pages, "textureLod—perform a texture lookup with explicit level-of-detail," https://registry.khronos.org/OpenGL-Refpages/gl4/html/textureLod.xhtml, Downloaded Aug. 9, 2023, 2 pages.

* cited by examiner

DOUBLE BUFFERING FOR ACCUMULATED HISTORY

FIELD

The field relates generally to maintaining multiple buffers for lighting components of a rendered image frame.

BACKGROUND

Rendering images using a computer has evolved from low-resolution, simple line drawings with limited colors made familiar by arcade games decades ago to complex, photo-realistic images that are rendered to provide content such as immersive game play, virtual reality, and high-definition CGI (Computer-Generated Imagery) movies. While some image rendering applications such as rendering a computer-generated movie can be completed over the course of many days, other applications such as video games and virtual reality or augmented reality may entail real-time rendering of relevant image content. Because computational complexity may increase with the degree of realism desired, efficient rendering of real-time content while providing acceptable image quality is an ongoing technical challenge.

Producing realistic computer-generated images typically involves a variety of image rendering techniques, from rendering perspective of the viewer correctly, rendering different surface textures, and providing realistic lighting. Rendering lighting may be particularly challenging and computationally expensive, as it typically involves tracing vast numbers of light beams between a light source and a viewer, reflecting off a variety of surfaces that the light might illuminate. Adding complexity, such as secondary reflections where a light beam bounces two or more times between the light source and the viewer, or diffuse reflections off irregular surfaces that may absorb some portion of the light, further complicates the calculations, but adds realism to the resulting rendered image.

Several techniques can be used to reduce the number of rays that are traced to produce a high quality rendered image, such as tracing only those rays that are visible to the viewer by starting from the viewer's perspective and tracing backward to the light source. Even with such techniques, the number of light rays that can be traced per image while maintaining a reasonable frame rate for applications such as gaming or virtual/augmented reality may be orders of magnitude lower than might be captured by a camera photographing the same image in real life. This may result in a somewhat noisy ray-traced image, in which some pixels may appear overly dark or light due to the relatively small numbers of light rays traced in applying ray tracing to the rendered image. For reasons such as these, it is desirable to manage noise in ray tracing rendered images, such as during real-time rendered image streams.

BRIEF DESCRIPTION OF THE DRAWINGS

The claims provided in this application are not limited by the examples provided in the specification or drawings, but their organization and/or method of operation, together with features, and/or advantages may be best understood by reference to the examples provided in the following detailed description and in the drawings, in which:

Figure 1:
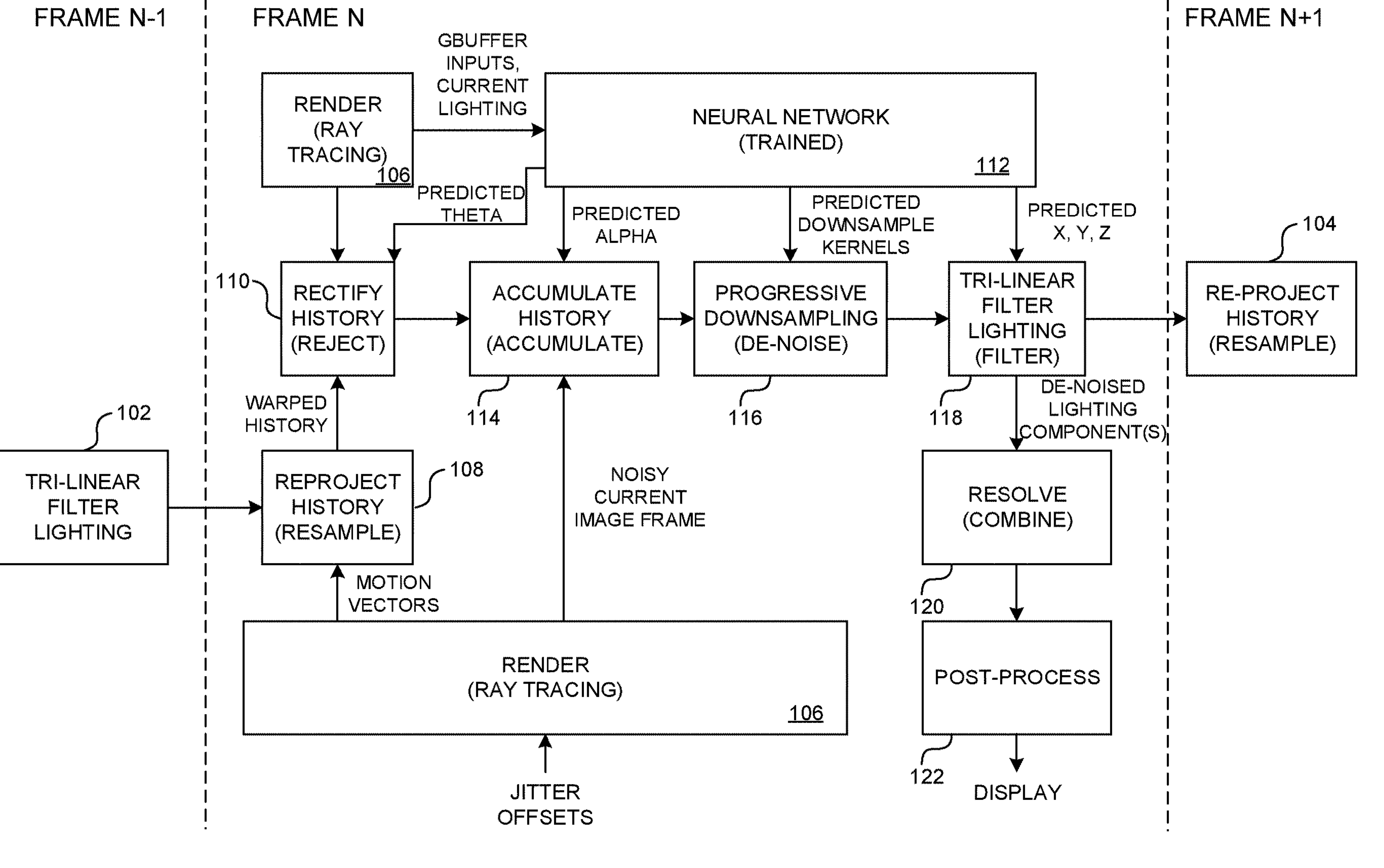
FIG. 1 is a block diagram of a ray tracing pipeline, consistent with an example embodiment.

Reference is made in the following detailed description to accompanying drawings, which form a part hereof, wherein like numerals may designate like parts throughout that are corresponding and/or analogous. The figures have not necessarily been drawn to scale, such as for simplicity and/or clarity of illustration. For example, dimensions of some aspects may be exaggerated relative to others. Other embodiments may be utilized, and structural and/or other changes may be made without departing from what is claimed. Directions and/or references, for example, such as up, down, top, bottom, and so on, may be used to facilitate discussion of drawings and are not intended to restrict application of claimed subject matter. The following detailed description therefore does not limit the claimed subject matter and/or equivalents.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

Ray tracing light in computer-rendered images can significantly improve the apparent realism of a rendered image, showing features such as directly lit surfaces and shadows that are a part of our normal environment, showing different surface textures through direct reflections and scattered light, and showing diffraction through transparent material and other such physical phenomena. Some surfaces, for example, may reflect light directly at an angle the same as the incident angle of a light ray such as a mirror does, known as specular reflection. Other surfaces may reflect light more diffusely, scattering the reflected light in a variety of different directions centered around a normal to the surface, known as diffuse reflection. Many objects in real life have both specular and diffuse reflective components, and are modeled as such while ray tracing a rendered image to provide realistic lighting effects.

But, the number of light rays that are traced in a large or complex image to produce a realistic image with acceptably low levels of illumination noise is very high, and often results in the rendering process for high-quality sequential images such as rendered movies taking days or weeks rather than the hour or two runtime length of the rendered movie. While this extended rendering and ray tracing time may produce high quality rendered movies that are more pleasant to watch, the same methods can't be effectively used for game play, augmented or virtual reality, or other applications where real-time rendering of images with acceptable image quality is important.

Ray tracing computation can be reduced for an image frame using certain techniques such as tracing rays from the camera to the light source rather than from the light source to the camera, ensuring that only light rays that actually reach the camera (or viewer) position are to be traced. Another solution for reducing ray tracing computation time is to apply ray tracing to such images using far fewer traced light rays, again resulting in far fewer ray tracing computations per rendered image frame. But tracing fewer light rays per pixel results in less accurate and more noisy illumination, including especially more lighting noise in areas that receive relatively few light rays. Monte Carlo (randomized) selection or sampling of light rays to trace can improve approximation of real-life light tracing, but hundreds or thousands of ray-traced samples per pixel may still be desired to produce photo-realistic images with acceptably low noise using traditional techniques.

Some examples presented herein therefore provide various methods and apparatus for reducing the apparent ray tracing light noise level in image sequences, such as those rendered in real-time or subject to other computational or power constraints. In one such example, machine learning such as a neural network may be employed to predict or estimate an effect to impart to a rendered image to reduce ray tracing illumination noise.

The imparted effects in one example includes using a selectively downsampled version of a rendered image frame for sampling a texture, where the downsampled version may be selected using a trained neural network. In a more detailed example, downsampled versions may be created using a kernel prediction network that de-noises the image as it downsamples, and in another example pixel values in a selected downsampled version may be selected or interpolated between pixel values of two downsampled images at a level of a pyramid of downsampling levels chosen by a trained neural network such as by using trilinear filtering hardware of a graphics processing unit (GPU).

In another example, an effect imparted to a rendered image uses a first accumulated history buffer for past rendered instances before at least some filtering and a second accumulated history buffer for past rendered instances after the filtering (such as by blurring, de-noising, or the like). For example, a buffer may accumulate pixel values for lighting the same points on an image over past image rendering instances. Pixel values in the first and second accumulated history buffers may be combined with pixel values from a current image frame to produce a display image frame, and the proportion of pixel values in the first and second accumulated history buffers may be selected using a trained neural network to produce a display image frame having acceptable detail and noise levels. Because the first unfiltered image buffer accumulates unfiltered pixel data, it may initially have more noise than the second filtered (e.g., blurred or de-noised) image buffer, but over time may accumulate more high frequency detail than the second filtered image buffer and may be used in greater proportion in rendering the displayed image frame.

In another example, the process of invalidating an accumulated history buffer, such as when a pixel becomes newly disoccluded (or visible to the viewer) in a current image frame, may be managed separately for diffuse and specular lighting. This process may be referred to as "rectification," and in a more specific example may be performed using motion vectors applied to lighting components of a previous image frame to re-project or provide a warped history that is aligned with a current image frame. This re-projected or warped history may be combined with the current image frame separately for specular and diffuse lighting components, such as by using lighting coefficients derived through machine learning such as by a trained neural network. In a further example, separate lighting component history buffers may be maintained for specular and diffuse lighting components, such that per-lighting rectification may combine re-projected or warped history for each lighting component with the same lighting component for the current image frame.

FIG. 1 is a block diagram of a ray tracing pipeline, consistent with an example embodiment. FIG. 1 shows generally on the left side production of image frame N−1 for a previous rendering instance, including an image frame from tri-linear filter lighting instance 102. A center portion of FIG. 1 shows components to produce an image frame FRAME N for a current rendering instance. A portion on the right of FIG. 1 shows an output from the current rendering instance as re-project history block 108 to be processed in a subsequent (e.g., future) rendering instance to produce an image frame FRAME N+1.

Rendering module 106 may provide an image frame referenced to current rendering instance N by rendering and ray tracing to produce a current image frame FRAME N, using jitter offsets and other such inputs for example. Rendered image frame at instance N may be provided along with motion vectors (for objects or textures in image frame FRAME N relative to rendering instance N−1) to the re-project history (resample) block 108. Reproject history block 108 may receive both image frame FRAME N referenced to a current rendering instance from render block 106 and a tri-linear filtered image output at 102 referenced to a previous rendering instance. Reproject history block 108 may re-project or warp the tri-linear filtered image output onto the current rendered image, such as by using rendered or estimated motion vectors. In one implementation, such estimated motion vectors may be generated by render block 106. In other implementations, such estimated motion vectors may be generated by one or more other sources. This may serve to align pixel values of an output image frame from a previous rendering instance with pixel values of image frame rendered in a current rendering instance. Based on the warped or pixel-aligned version of the past image frame, rectify history block 110 may mitigate effects of image content being disoccluded or becoming visible in the current image frame FRAME N that were not visible in the prior image frame FRAME N−1. In a further example, rectification or history invalidation may also be performed for changes in view-dependent lighting, such as where the camera's current view direction has changed sufficiently from a prior image's point of view to render specular highlight and/or reflection detail invalid between image frames.

In a particular example, predicted blending coefficients theta may be received in rectify history block 110 such as from trained neural network 112 to predict or estimate the degree to which the warped history is to be added to the current, somewhat noisy, rendered frame. This may be achieved according to expression [1] as follows:

$$\text{rectified}(x, y) = \text{reset}(x, y) \times (1 - \text{theta}(x, y)) + \text{warped}(x, y) \times \text{theta}(x, y), \quad [1]$$

where:

rectified(x,y) is a pixel value at pixel location x,y in an output image frame;

reset(x,y) is a pixel value at a pixel location x,y in a current, noisy rendered image frame;

theta(x,y) is a blending coefficients or per-pixel rectification value in the range of [0,1], received from trained neural network 112; and warped(x,y) is a pixel value at pixel location x,y in a warped history (e.g., received from re-project history block 108).

As may be observed from expression [1], a resulting rectified output may comprise a combination of separately accumulated specular and diffuse lighting histories, as well as some "reset" or noisy pixels from a current rendered image, such as at locations where pixels become disoccluded in image frame N. For a visibly perfect noiseless ray-traced render, each frame may accumulate samples for at least thousands of cast rays per pixel. But, casting such large numbers of rays per frame may be computationally prohibitively expensive, and therefore may prevent use in real-time applications such as gaming and virtual or augmented reality. Accumulate history block 114 in some examples may therefore be used to combine an accumulated history of rendered pixel values over time with a current noisy rendered image frame, selectively combining a re-projected, rectified history received from rectify history 110 with a noisy current frame received from render and ray tracing unit 106. An accumulation process at accumulate history block 114 may use a parameter alpha received from trained neural network 112 to determine a proportion of the current noisy image frame to be blended with the re-projected, rectified history, and in a further example may use a separate accumulated history and alpha values for corresponding separate lighting components such as specular and diffuse lighting components.

In another example, double buffers may be maintained for each lighting component in accumulate history block 114—an unbiased buffer that may store history of past image frames lacking at least one step of filtering or processing, and a biased buffer that may store a history of past image frames with such filtering or processing applied. The filtering or processing applied to the biased buffer's stored frames may comprise in various examples blurring, de-noising, kernel prediction filtering, or any other such processing. In a more specific example, the filtering or processing applied to the biased buffer's stored frames may include filtering or processing that removes noise or high frequency content from the stored images, or may impart a blurring or softening effect to the past image frames stored in the biased buffer. The unbiased buffer may accumulate the noisy frame history received from render and ray tracing unit 106, and the biased buffer may accumulate the image frame history provided to a display device or the image frame history at any other filtered stage between being filtered post-rendering and being displayed such as a re-projected, rectified, and combined image.

An unbiased buffer in some examples may accumulate samples by combining and/or averaging new image frame samples with an accumulated history, such as based on the number of prior accumulated samples that are stored in the unbiased buffer. By tracking a number of unbiased samples for a pixel location represented in the accumulated unbiased buffer, a degree to which the unbiased buffer is blended into a current image frame can be increased. The unbiased buffer can be more strongly incorporated once pixel values for a sufficient number of past image frames have been accumulated for the unbiased buffer's pixel values to represent more high frequency spatial content and less noise than with relatively fewer accumulated past unbiased or unfiltered frames. Such accumulation in an unbiased accumulated buffer may be implemented according to expression [2] as follows:

$$\text{Unbiased}(x, y) = \frac{((\text{unbiased}(x, y)_{t-1} * \text{count}) + \mathit{newSample}(x, y)}{\text{count} + 1} \quad [2]$$

where:

Unbiased(x,y) is a pixel value at pixel location x,y in an unbiased accumulated history being calculated;

$\text{Unbiased}(x,y)_{t-1}$ is a is a pixel value at pixel location x,y in a prior unbiased accumulated history;

count is a number of samples or image frames represented in the prior unbiased accumulated history; and newSample(x,y) is a pixel value at a location x,y in a new image frame being added to the accumulated history.

A value of count may be incremented by one for each successive accumulation of pixel values in a new unbiased sample or image frame. A resulting Unbiased(x,y) value may be blended and/or combined into buffer Biased(x,y) for respective pixel location (x,y) using a method such as an exponential moving average formula, with parameter alpha (x,y) (provided by the trained neural network 112) applied to determine a degree to which an unbiased accumulated history in Unbiased(x,y) is to be blended into and/or combined with a biased accumulated history Biased(x,y). Blending an unbiased accumulated history Unbiased(x,y) into a biased accumulated history Biased(x,y) may be performed in a further example according to expression [3] as follows:

$$\text{Biased}(x, y) = (\text{Biased}(x, y)_{t-1} * (1 - \text{alpha}(x, y))) + (\text{Unbiased}(x, y) * \text{alpha}(x, y)) \quad [3]$$

where:

Biased(x,y) is a pixel value at pixel location x,y in a biased accumulated history being calculated;

$\text{Biased}(x,y)_{t-1}$ is a pixel value at pixel location x,y in the biased accumulated history calculated for the past image frame instance t−1;

Unbiased(x,y) is a pixel value at pixel location x,y in an unbiased accumulated history; and alpha(x,y) is a per-pixel blending value in the range [0,1], predicted by trained neural network 112.

In one particular example, values for Biased(x,y) may be computed at accumulate history block 114 according to expression [3]. As alpha(x,y) becomes larger, a proportion of Unbiased(x,y) relative to Biased(x,y) may grow, and accumulated high frequency detail in Unbiased(x,y) may gradually replace and/or be incorporated into the blurred, de-noised, or otherwise filtered accumulated history in Biased (x,y). This process may be repeated separately for each lighting component, such as for specular and diffuse lighting components, and trained neural network 112 may provide separate parameters alpha(x,y) for corresponding different lighting components.

Output from accumulate history block 114 may be provided to progressive downsampling (de-noise) block 116, which may produce an image pyramid (or mip-chain) of progressively downsampled images. Such progressively downsampled images may be aliased to a texture such as by using graphic processing unit (GPU) trilinear filtering hardware applicable for trilinear interpolation, for example. Progressive downsampling to produce an image pyramid at block 116 may be performed separately for each lighting component, such as specular and diffuse lighting components, and in a further example may apply kernel coefficients separately to the lighting components. Such kernel coefficients may be determined by one or more kernel prediction networks, such as may comprise a part of trained neural network 112, for each lighting component as shown at the connection between neural network 112 and progressive downsampling block 116. Each downsampling stage may be derived from a previous downsampling stage, such as by downsampling a 2048×2048 image to 1024×1024, downsampling the 1024×1024 image to 512×512, downsampling the 512×512 image to 256×256, and downsampling the 256×256 image to 128×128. In one particular example, the progressive downsampling may be performed according to expression [4] as follows:

$$I_{D+1}(x, y) = \frac{\sum_{i,j} I_D(i, j) * k(x, y, i, j)}{\sum_{i,j} k(x, y, i, j)} \quad [4]$$

where:

$I_{D+1}$(x,y) is a pixel value for a pixel location (x,y) in an image pyramid at a downsampling level D+1 (being calculated by downsampling from level D);

$I_D$(i,j) is a pixel value for a pixel location (i,j) in the image pyramid at downsampling level D; and k(x,y,i,j) is a kernel coefficient to be applied to a pixel value at pixel location (i,j) to produce an output pixel value at a pixel location (x,y).

Figure 3:
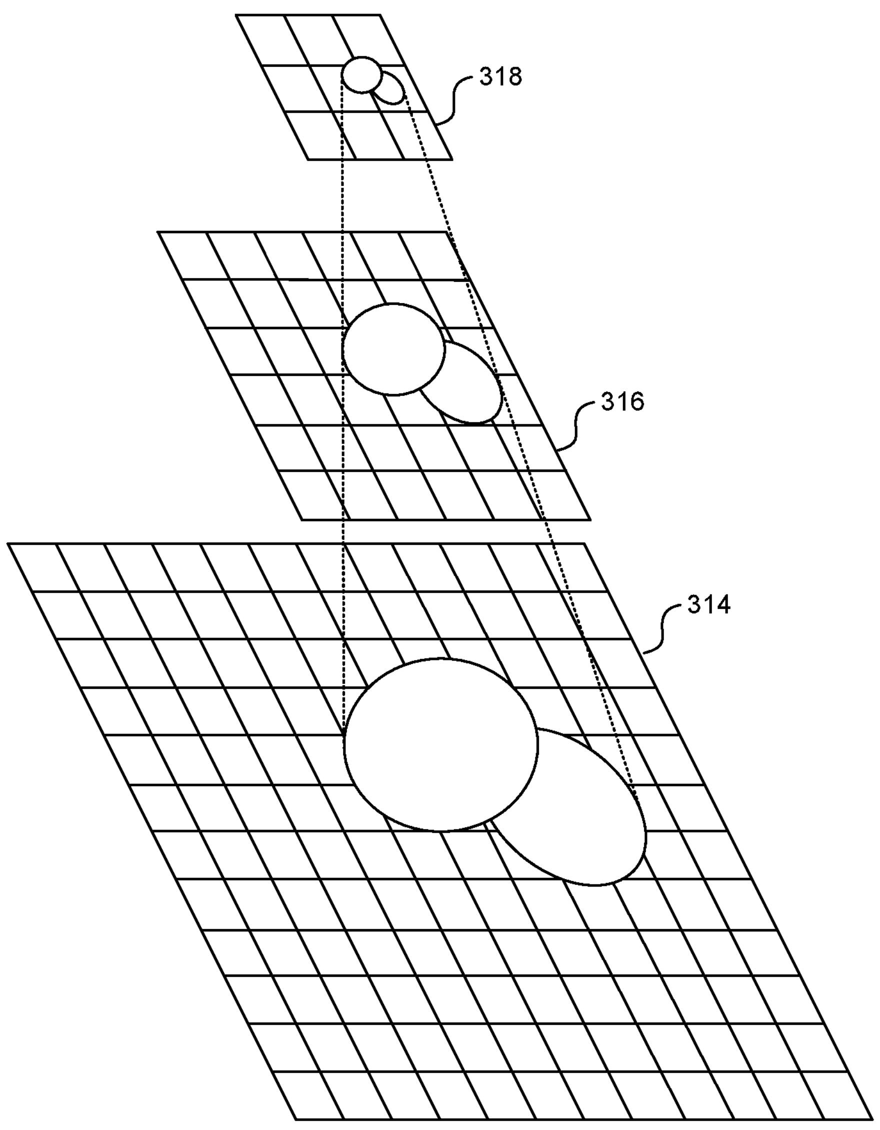
FIG. 3 shows a three-level mip-map or image pyramid, consistent with an example embodiment.

Downsampling according to expression [4] may be performed repeatedly to produce a pyramid of a desired number N levels, where N may be a selectable or tunable parameter of the downsampling image pyramid. A pyramid where N=3 is shown in FIG. 3, and will be discussed in greater detail with respect to that image. Because each successive downsampling level of a pyramid is lower resolution than the previous downsampling level, but comprises pixels averaged over a larger area, each successive level of the pyramid has less noise but also lower resolution and less high frequency detail or sharpness than previous levels.

An image pyramid built at progressive downsampling block 116 may be employed by tri-linear filter lighting block 118, which in a more detailed example may use predicted x, y, and z parameters from trained neural network 112 to select an image location within the downsampling pyramid to sample. In a more detailed example, to filter a pixel at given x and y locations on the rendered image being processed, the tri-linear filter block may receive an x offset and ay offset that shift the location of the sampling such as to make the sampling edge-aware, and a z parameter that may indicate the level of the progressive downsampling pyramid from which to sample. The x, y, and z coordinates in some examples may be non-integers, such as where interpolation between pixel locations or between downsampling pyramid levels is desired.

In some examples, a GPU hardware implementation of tri-linear interpolation that may often be found in modern high-end GPUs may be employed, such as via a GLSL textureLod function, to perform the tri-linear filtering in block 118. Such a GLSL textureLod function, for example, may take three parameters: a pointer to the image pyramid; the normalized non-integer texture coordinates (x,y) to sample within the pyramid; and a non-integer depth or level of detail (z) coordinate corresponding to the pyramid level at which the texture may be sampled. In some examples, a degree of tri-linear filtering may be controlled by trained neural network 112's prediction or estimation of two separate parameters: uv_offset (x and y) and level of detail (z), for each lighting component. In a more specific example, the uv_offset may form a bias to the texture coordinates which are sampled (second argument), and the depth or level of detail directly predicts or estimates a level of the image pyramid which is sampled (third argument). Trained neural network can therefore control how heavily blurred a resultant image is via the level of detail or the z parameter, where a larger level of detail corresponds to sampling from higher levels of the pyramid that have been successively downsampled more times than previous lower levels, and therefore may likely have more blur and less ray tracing illumination noise.

While sampling from higher levels of the pyramid (larger level of detail or z) may result in ray tracing illumination with less noise, sampling from higher levels the unfortunate drawback of losing high-frequency edge information due to higher pyramid levels having a lower image resolution. To compensate for this, trained neural network 112 may predict or estimate the uv_offset or x and y parameters that may offset the horizontal and vertical sampling coordinate position to allow for edge aware tri-linear sampling, much like a bilateral filter. As a tri-linear filter samples from the downsampling pyramid using parameters provided by the trained neural network, the tri-linear filter can sample the downsampling pyramid from any spatial location within an effective receptive field to maintain high frequency details.

Resulting filtered specular and diffuse image samples that may be provided as output from tri-linear filter 118 may be resolved or combined at block 120 to form an output image, which may then be post-processed as needed such as to present an image in a desired display resolution at 122 before being displayed. The filtered specular and diffuse image samples from tri-linear filter 118 may also be stored or provided for processing the next image frame, as reflected by re-project history block 104 (corresponding to the current frame's re-project history block 108, which similarly receives prior frame tri-linear filtering results for specular and diffuse lighting from block 102). The example of FIG. 1 may provide significant advantages over current state-ofthe-art approaches to de-noising rendered images in a sequence, such as greatly reduced latency and power consumption while providing similar or improved image appearance due to reduced ray tracing illumination noise.

Figure 2:
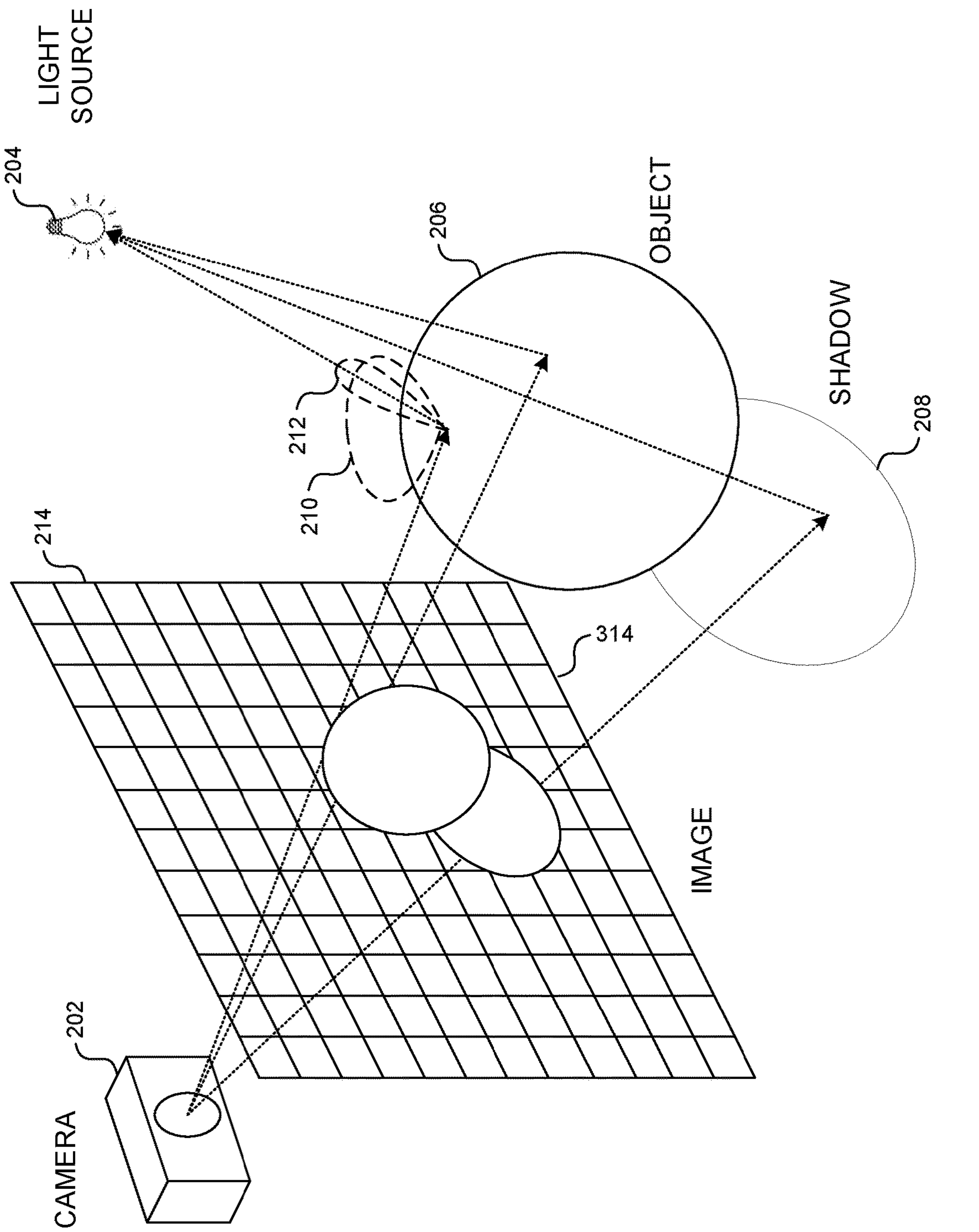
FIG. 2 shows ray tracing a rendered object, consistent with an example embodiment.

FIG. 2 shows ray tracing a rendered object, consistent with an example embodiment. Ray tracing in this example may be performed by tracing rays from the perspective of a camera 202 to a light source 204, so that areas illuminated by light source 204 that are not seen by the camera are not ray traced. This avoids wasting computational resources on ray tracing light from light source 204 that will not be seen from the perspective of the viewer of the rendered and illuminated frame (i.e., the camera), speeding up the ray tracing process.

Dashed lines in the simplified example of FIG. 2 show how individual rays may be traced from the camera toward object 206 and shadow 208, reflecting off one or more surfaces toward light source 204. The reflections in this example comprise two different lighting components—specular reflections which are relatively narrow in the degree to which their angle of reflection matches angle of incidence, and diffuse reflections in which the angle of reflection may vary significantly more from the angle of incidence due to variations in the surface texture. An example of a probability function of diffuse reflection is shown at 210, which illustrates that diffuse reflected light hitting the surface of the object 206 may be reflected over a wide variety of angles, with a probability approximately centered around a normal to the surface of the object. Specular reflections shown in the example at 212 differ in that light is reflected at a narrower range of angles, with the range of angles centered approximately around the angle of incidence of light to the surface.

Specular reflections for some surfaces may be limited to very narrow angles of reflection, such as for surfaces that are metal, mirrored, wet, or the like, sometimes resulting in the ability to see a clear reflected image off object 206. Diffuse reflections are more characteristic of dielectric object materials such as cloth, skin, or other such surfaces, and tend to scatter and absorb light rather than reflect clear images of other objects or light sources. Many objects such as wood or stone have a specular lighting component and a diffuse lighting component in their reflections, and will look more realistic in a rendered image if both specular and diffuse lighting components are ray traced to and from such objects.

Ray tracing light reflecting off surfaces may use a parameter called albedo to represent the percentage of light impacting a surface that is reflected rather than absorbed. A black object that absorbs all incident light has an albedo of zero, while a white object that reflects all light has an albedo of one. Albedo may be tracked separately for specular and diffuse lighting, but because nonmetallic materials generally have very low specular albedo it is often disregarded for nonmetallic objects. The reflected light off a nonmetallic surface can therefore be characterized as being specular reflections plus albedo times the diffuse reflections, where the albedo controls the amount of the diffuse light component that is rendered as reflected instead of absorbed. Metals present a special case that may have a specular albedo but very low diffuse response, and although it is an example of a material that is rendered differently it generally has relatively low illumination noise so may often be ignored in ray tracing de-noising.

Rays being traced from camera 202 to light source 204 in the simplified example of FIG. 2 may be captured by calculating where the rays pass through the image plane of image grid 214, which forms the ray-traced or illuminated rendered image that is processed and displayed. An image grid here is shown as two-dimensional 12×12 array of pixels, with different light rays being traced through each pixel from the camera 202 to the light source 204. Light rays selected for tracing in some examples may be random, such that they have an approximately equal chance of passing through any point on the grid. Rays that may impact the object and reach light source 204 that do not pass through the grid 214 will not be displayed in the rendered image, and so are not traced. Although the simplified example of FIG. 2 shows a 12×12 grid of pixels, practical implementations may include significantly more pixels such as to match the display resolution of a user device like a computer, smart phone, or television.

In one simplified example, a ray tracing process may shoot at least one light ray through each pixel or square in the image grid 214, and observe whether the ray impact any object primitives (typically triangles of a rendered object mesh) such as object 206 in the scene. If the ray hits an object, the distance along the ray from the camera to the object is calculated, and the color data of the object contributes to the final color of the pixel. The ray may bounce off the primitive specularly and/or diffusely and pick up color and lighting from other objects, and may pick up light and color from light sources such as light source 204. In applications with many objects in the rendered scene such as a video game the number of rays cast per pixels may desirably be high, such as in the hundreds or thousands of rays per pixel per rendered image frame. If computational resources, power, frame rate, and other such considerations may limit the number of rays cast per pixel to fewer rays such as single digits or tens of rays per pixel, a resulting rendered and illuminated image may have visually noticeable illumination noise and so may benefit from ray tracing de-noising methods and systems such as those described herein.

FIG. 3 shows a three-level downsampling pyramid, consistent with an example embodiment. Here, pixel grid 314 shows the ray-traced image frame from the ray-traced image 214 of FIG. 2 represented as a 12×12 pixel image or texture, from which other levels of the downsampling pyramid are derived. In this example, each successive level of the downsampling pyramid has half the resolution in each dimension as the preceding level, progressing to a 6×6 image at 316 and a 3×3 image at 318. In practical applications, the number of pixels of the base image 314 may be much larger, such as to match the display resolution of a computerized device. The downsampling pyramid of FIG. 3 is a simplified version of an image pyramid that may be constructed by progressive downsampling block 116 of FIG. 1, and some examples are discussed in greater detail with respect to that figure.

As shown here, the original image 314 may be progressively downsampled to produce images of lower resolution and lower noise that can be aliased to rendered image objects, such as using a GPU's tri-linear filtering hardware commonly used for trilinear interpolation. The downsampling is performed in some examples using a de-noising filter such as a filter generated by a neural network-based kernel prediction network, which in some examples comprises a convolutional neural network that generates a kernel of scalar weights or coefficients applied to neighboring pixels to calculate each de-noised pixel of an image. In a more detailed example, a kernel prediction network may predict a matrix of kernel coefficients for each pixel that comprises coefficients or weights for neighboring pixels that can be used to determine the de-noised pixel value by computing the de-noised pixel value from its original value and its neighboring pixels. Filter coefficients generated by a kernel prediction network may be used to build successive layers of the pyramid of FIG. 3 may be or comprise a part of a neural network such as the neural network 112 of FIG. 1.

In the example of FIG. 3, each level of the downsampling pyramid may be derived from a lowest level, such as by using filter coefficients generated by a kernel prediction network, other filtering, averaging, or another suitable method, and may result in an image that is lower in both resolution and noise than the preceding, lower pyramid level image from which it is derived. The progressive downsampling may be performed separately for each of specular and diffuse lighting components, which may be combined in a further example to generate a displayed image.

Although the number of pyramid levels in the example of FIG. 3 is three, this process may be performed repeatedly to produce a pyramid of any desired number N levels, where N may be a selectable or tunable parameter of the downsampling image pyramid. In further examples, the number of levels N may be determined by neural network prediction or estimation, by the desired output resolution of the rendered image, by the anticipated noise level of the rendered image, and/or by other such parameters.

The image pyramid of FIG. 3 may be employed by a GPU's tri-linear filter lighting hardware using predicted x, y, and z parameters from a neural network to select an image texture location within the pyramid to sample. In a more detailed example, to filter a pixel at given x and y locations on the rendered image being processed, the tri-linear filter block may receive an x offset and a y offset that shift the location of the sampling such as to make the sampling edge-aware, and a z parameter that indicates the level of the progressive downsampling pyramid from which to sample. The x, y, and z coordinates may be non-integers, such as where interpolation between pixel locations or downsampling pyramid levels is desired. The z coordinate in particular may correspond to a level of detail (lod), which may be an integer corresponding to a downsampling pyramid level or may be a non-integer corresponding to an interpolated location between downsampling pyramid levels to control the degree of blurring in sampled texture for each filtered pixel.

Once desired x and y offsets and level of detail z have been specified for each pixel and appropriate texture filtering has been applied, the filtered images for specular and diffuse lighting may be combined and/or post-filtered such as to change the resolution to a desired display resolution for display. In a further example, the combined image is stored or buffered for use in filtering the next rendered frame's ray traced texture as shown at N+1 on the right side of FIG. 1.

Figure 4A:
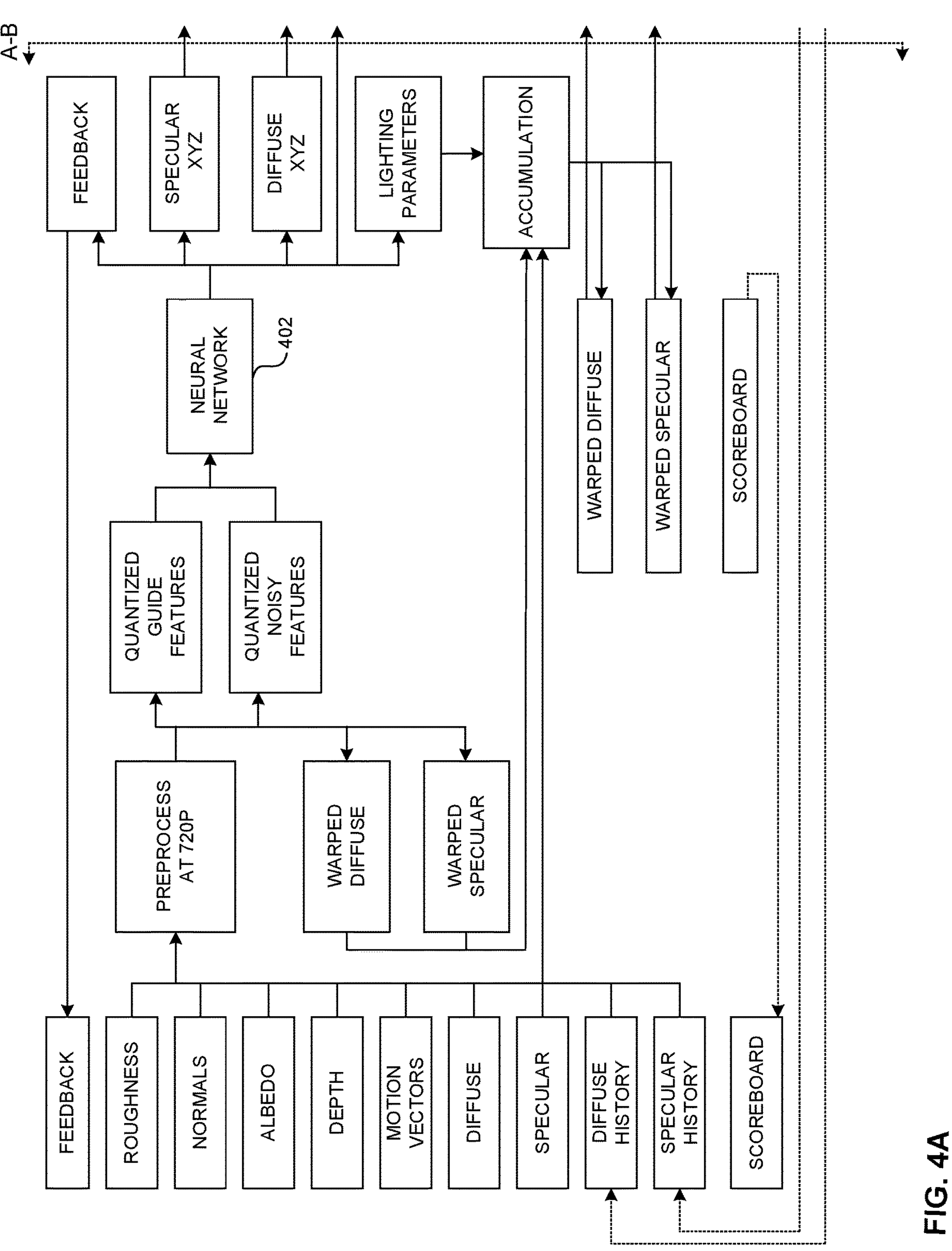
FIGS. 4A and 4B are a block diagram of a more complex system implementing ray tracing de-noising, consistent with an example embodiment.
Figure 4B:
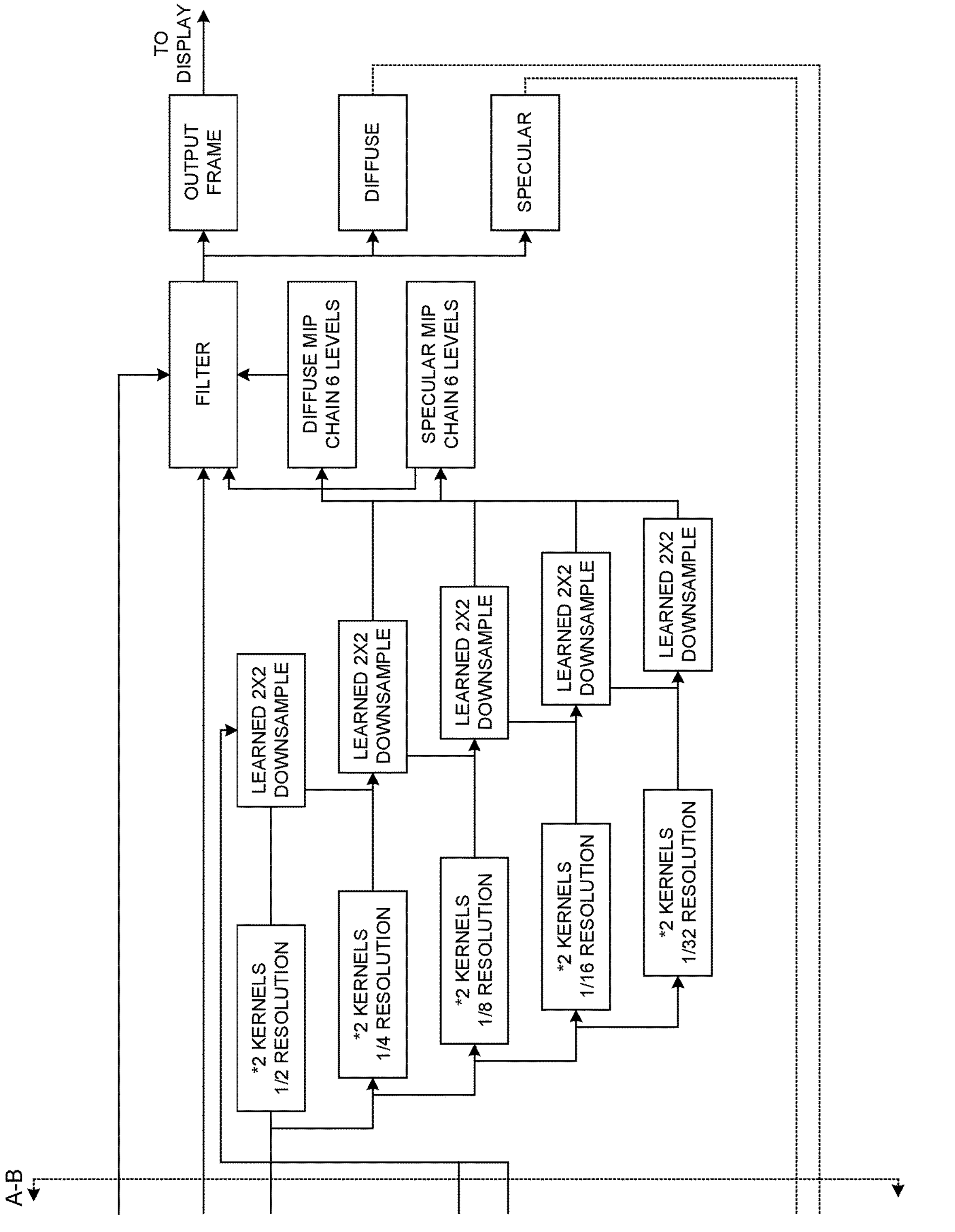

FIGS. 4A and 4B are a block diagram of a system implementing ray tracing de-noising, consistent with an example embodiment. The diagram again shows generally the rendering (left portion of FIG. 4A), reprojection or warping of buffered history and accumulation of images into history buffers (FIG. 4A), and downsampling to generate a six-level downsampling pyramid (FIG. 4B), which are combined and filtered to produce an output frame provided to a display. The components approximately correspond to FIG. 1, with the neural network (an example of a trained Level of Detail neural network implementation) shown at 402 corresponding to FIG. 1's trained neural network 112. Although six downsampling pyramid levels are employed here, other numbers of pyramid or mip-chain levels may be used in other examples, and may be a tunable parameter such as dependent on the rendered image resolution and/or other parameters. The six downsampling pyramid levels of the example of FIG. 4 in a further example may provide a wide range of levels of detail for mapping de-noised texture onto a rendered image, such where a full 4 k image at 3840×2160 is successively downsampled using a kernel prediction filter to 1920×1080, 960×540, 480×270, 240×135, and 120×67.

The downsampling pyramid level selected in some examples may be based at least in part on the number of temporal image frame samples accumulated in a history buffer. In a further example a parameter alpha used in accumulating image history in a buffer may be determined or constrained based on the number of accumulated temporal image frame samples. In a more detailed example, sample count constraints may be imposed on alpha and pyramid level z or level of detail (lod) at least in part to speed up training convergence and ensure desired behavior of the trained neural network or LODNet 402. Alpha, which represents a linear blend between unbiased and biased buffers and may be predicted by trained neural network 112, may be constrained to ensure that at least a MinAlpha percentage of the first unbiased buffer is taken one the sample count is sufficiently large, using a formula such as according to expression [5] as follows:

$$OutAlpha = \min\left(\text{Min}Alpha,\ \text{Min}Alpha * \frac{\min(\text{count},\ \text{Max}Count)}{\text{Max}Count}\right) \quad [5]$$

where:

- OutAlpha is the output alpha level selected for sampling from the downsampling pyramid
- MinAlpha is the smallest percentage of unbiased buffer the algorithm is allowed to take once the count reaches a threshold value;
- MaxCount is the threshold number of temporal image samples at which the MinAlpha becomes the minimum allowable alpha; and
- count is the number of temporal image samples accumulated in a history buffer.

MinAlpha therefore becomes the minimum allowable alpha only once count reaches MaxCount, with the minimum allowable alpha increasing gradually as count increases toward MaxCount. The MinAlpha and MaxCount values are tunable to ensure that the network makes use of slower-converging high spatial frequency lighting features that are most likely to converge inside only the unbiased buffer, such as high frequency soft shadows, after an adequate count of temporal image samples have been accumulated. In another example, the level of detail z or pyramid level is scaled as a function of count according to expressions [6], [7], and [8] as follows:

$$LodScale = lerp\left(Pyramid\text{Max},\ Lod\text{Min},\ \frac{\min(\text{count},\ \text{Max}Count)}{\text{Max}Count}\right) \quad [6]$$

$$LodBias = lerp\left(Pyramid\text{Min},\ Pyramid\text{Min},\ \frac{\min(\text{count},\ \text{Max}Count)}{\text{Max}Count}\right) \quad [7]$$

$$LodOut = LodIn \times LodScale + LodBias \quad [8]$$

where:

- PyramidMin is a constraint to define a minimum level of downsampling for a downsampling image pyramid;

PyramidMax is a constraint to define a maximum level of downsampling for the downsampling image pyramid; and LodMin and LodMax are tunable values which define the minimum and maximum Lod (Level of Detail) values when the sample count is lower than the tunable parameter MaxCount.

One purpose of a constraint according to expression [6], [7] and/or [8] is to encourage a neural network to use the full breadth of the progressive downsampling pyramid over time, while preventing overblurring once an adequate number of prior image samples have been accumulated in the unbiased buffer. A maximum and minimum amount of blurring may therefore be constrained as a function of the number of temporally accumulated samples in the formulas presented above.

Figure 5:
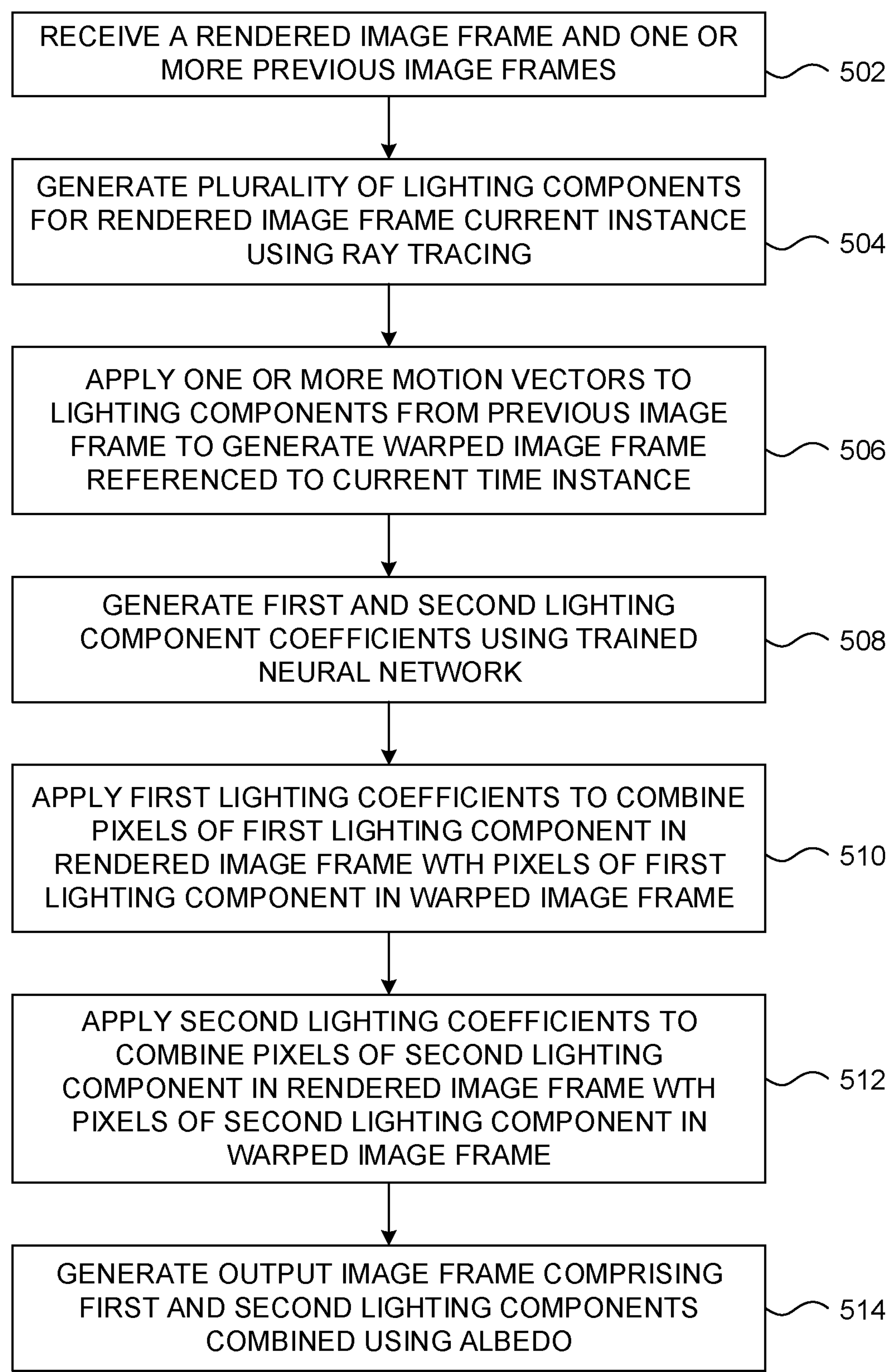
FIG. 5 is a flow diagram of process to rectify reprojected prior image frame data, consistent with an example embodiment.

FIG. 5 is a flow diagram of process to rectify reprojected prior image frame data, consistent with an example embodiment. Reprojection may include warping or mapping pixels of a prior image or texture onto a current rendered image, such that prior image data or history can be used in determining current pixel texture values for a current instance or current rendered image. Rectification may include selectively blending a prior image history for a portion of a rendered image that is disoccluded or where view-dependent lighting effects such as specular highlights and reflections change as a result of a camera's changed perspective. Such rectification may be performed by rectify history block 110 and/or according to expression [1], for example.

At 502, a rendered frame may be received, along with one or more previous image frames. A plurality of lighting components may be generated for the rendered image frame at 504, which in a further example may comprise specular and diffuse lighting components. Lighting components in some examples may be generated via ray tracing, such as by rendering module 106, for example. One or more motion vectors may be applied to lighting components from the previous image frame at 506, which may be used to warp or map the previous image frame texture data onto corresponding pixel locations in the current rendered image instance. In a further example, the motion vectors may include different motion vectors for different lighting components such as diffuse and specular.

First and second lighting component coefficients may be generated at 508, such as using a trained neural network (e.g., neural network 112). Such lighting component coefficients may determine how portions of one or more previous warped image frames are to be blended with an image frame rendered in a current rendering instance to address effects such as disocclusion or change in lighting component. A first set of lighting component coefficients may be applied to combine pixels of a first lighting component (such as specular lighting) in the current rendered image frame with pixels of the first lighting component in the one or more previous, warped image frames at 510. A set of second lighting component coefficients may be applied to combine pixels of a second lighting component (such as diffuse lighting) in the current rendered image frame with pixels of the second lighting component in the one or more previous, warped image frames at 512. Operations at blocks 510 and 512 may apply lighting component coefficients according to expression [1], for example. In a more detailed example, the per-lighting component lighting coefficients may be determined per-pixel, determining on a pixel-by-pixel basis the degree to which to include one or more warped historical rendered image textures in the combined image.

An output image frame may be generated at 514, comprising first and second lighting components in which historic warped rendered images are combined with the current rendered image, using a term called albedo to determine at least a proportion of diffuse lighting that is reflected by texture rather than absorbed. In various embodiments, the albedo may also be determined on a per-pixel basis, a per-texture or object basis, or based on other such rendered image characteristics.

The flow diagram of FIG. 5 illustrates how using per-lighting rectification can improve the noise level of a ray-traced rendered image. The process uses low percentages of the relatively noisy newly-rendered and newly-lit image texture in favor of past warped texture data to provide reduced noise except where a newly-disoccluded or newly-lit pixels in an image object render such past warped texture data invalid and the newly-rendered image texture is favored.

Figure 6:
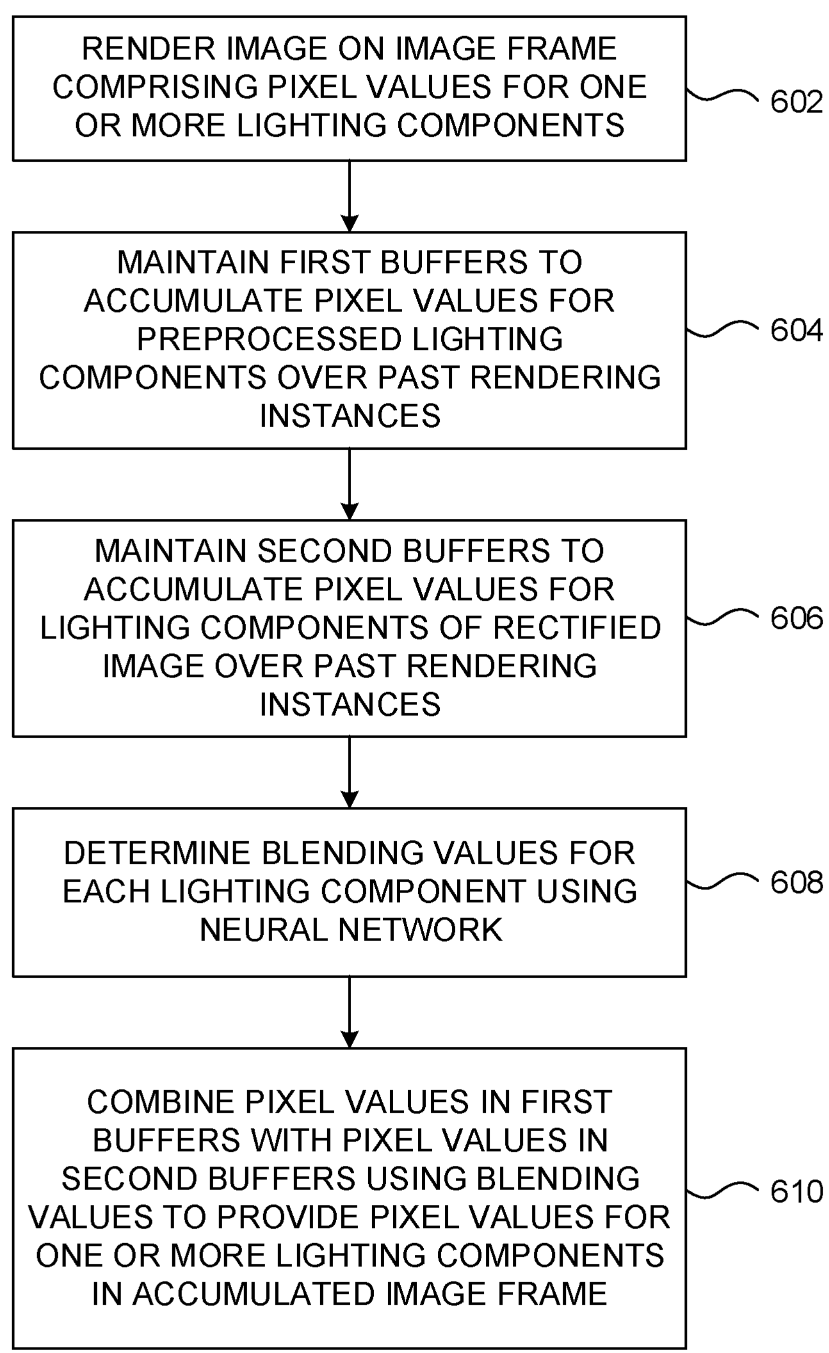
FIG. 6 is a flow diagram of a process to use double buffers for accumulated rendered image history, consistent with an example embodiment.

FIG. 6 is a flow diagram of a process to use double buffers for an accumulated rendered image history, consistent with an example embodiment. By using different buffers to accumulate pixel values for filtered and unfiltered versions of lighting components for an image over past rendered instances, an amount of ray tracing or illumination noise in a combined image may be reduced while improving retention of high-frequency detail. In a further example, blending values for each lighting component used to blend filtered and unfiltered image histories to produce a combined rendered image may be determined by a trained neural network or other such machine learning system.

At 602, a rendered image frame may be illuminated using ray tracing, such as by rendering a texture on the image and ray tracing light within the image using one more lighting components such as specular and diffuse lighting components. First buffers may accumulate the pixel values for lighting components for past rendering instances at 604, storing the rendered image with its ray-traced lighting components before one or more additional image processing stages such as rectification, spatial filtering, and/or de-noising occur. In a more detailed example, separate first buffers for the one or more lighting components may be maintained, such as for diffuse and specular lighting.

Second buffers similarly may accumulate the pixel values for lighting components for past rendering instances at 606, storing the rendered image with its ray-traced lighting components after one or more additional image processing stages such as rectification, spatial filtering, and/or de-noising occur. The second buffers may therefore maintain a de-noised, softened, blurred, or filtered version of the rendered and ray-traced images stored in the first buffers, and in some examples may be known as biased buffers while the first buffers may be known as unbiased buffers. Although images stored in the second buffers may have less ray tracing illumination noise and be smoother in appearance than images stored in the first buffers, the images stored in the first buffers will over time accumulate greater high frequency or high resolution detail and have less noise as more rays per pixel are accumulated in the buffer.

Blending values, such as values alpha, for each lighting component are determined using a trained neural network, such as trained neural network 112, at 608, which may be used to combine pixel values from the first and second buffers to create an image frame. The blending values may generally change from being biased toward including more of the second buffer's filtered image pixel values when the accumulated history for a pixel is low (such as where a pixel has been recently disoccluded during rectification) to being biased toward including more of the first buffer's unfiltered image pixel values as the accumulated history for a pixel increases to a level where ray tracing lighting noise is reduced. These blending values may therefore be employed at 610 to combine pixel values in the first buffers with pixel values in the second buffers to provide pixel values for one or more lighting components in an accumulated image frame such as according to expression [3], for example. Acceptable levels of noise may be maintained when the buffered history for a pixel is low by favoring pixel values from the second buffer, and high frequency detail from the first buffer may be introduced as the buffered history for a pixel accumulates a greater number of samples by increasing the weighting of pixel values from the first buffer.

Figure 7:
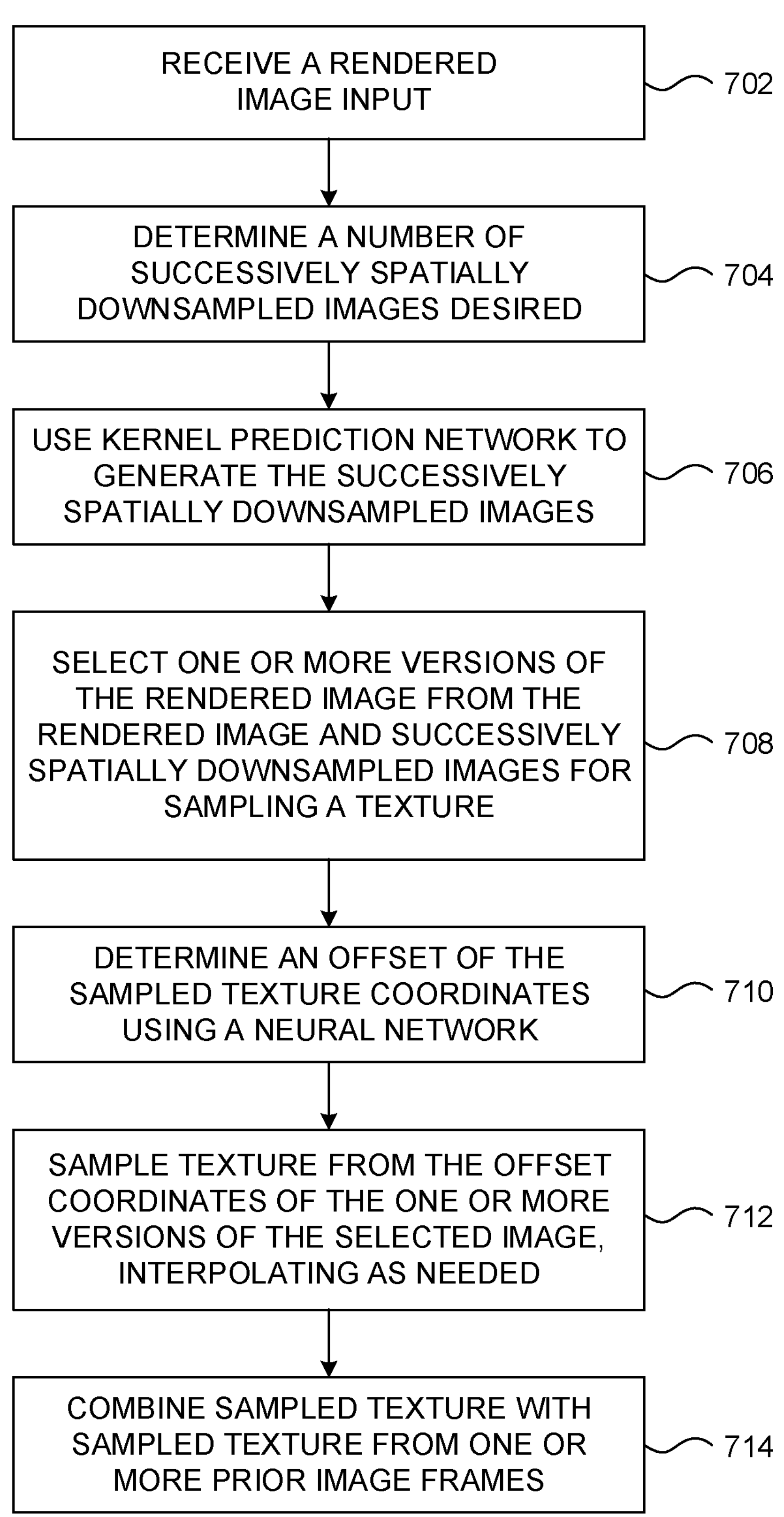
FIG. 7 is a flow diagram of a method of using progressively downsampled texture maps and trilinear filtering to de-noise a rendered image, consistent with an example embodiment.

FIG. 7 is a flow diagram of a method of using progressively downsampled texture maps and trilinear filtering to de-noise a rendered image, consistent with an example embodiment. At 702 a rendered image frame may be received, which may be previously processed such as by using history buffers, image rectification and combining, and other methods such as those described in the examples herein. A desired number N of successively spatially downsampled images may be determined at 704, which in a further example may be determined using functions or methods such as according to expression [4], for example. In an implementation, a desired number N of successively spatially downsampled images desired may be based at least in part on the overall resolution of the image, the amount of noise in the rendered image, the hardware capabilities of a GPU used to perform tri-linear filtering using the downsampled images, and other such characteristics of the rendered image and/or the image processing pipeline.

Coefficients generated by a kernel prediction network may be applied to the received rendered input image from 702 to generate a first spatially downsampled image, which has a lower resolution but lower noise than the received rendered input image. Reduction in noise in this example is due in part to averaging pixels to a lower resolution version of the original image, and in part due to use of coefficients generated by a kernel prediction filter to downsample the rendered image. A newly downsampled image may then be used to create a next spatially downsampled image, and such process repeats until the desired number of successively spatially downsampled images N are generated.

At 708, the neural network selects one or more version of the rendered image from among the rendered image originally received at 702 and the successively rendered downsampled images, such as by specifying a level z in the downsampled image pyramid. Such a level z may be selected according to expressions [6], [7] and/or [8], for example. In some examples the z level chosen may be an integer specifying which of the N images are used individually, while in other examples the level z is a non-integer in the range of 1–N such that values that are not integers specify a level or degree of interpolation between two sequential or neighboring images in the image pyramid.

In some examples, an x,y spatial offset for sampling textures may be provided by the trained neural network in addition to a z value or level of detail for each pixel in the rendered image as shown at 710, and may represent an offset at which to sample the texture from the original image's pixel location. Such an offset can compensate for various motion effects, improve awareness of edges, and perform other such compensations to improve the visual accuracy of the selected texture. Offset coordinates in various examples may also be integer values, or may be non-integers that may result in interpolation between the texture at two different pixel locations.

A texture may then be sampled from the x,y offset location and z or pyramid level of detail at 712, interpolating where the x, y, or z parameters are non-integers. In some examples, the specular and diffuse lighting components may be filtered separately using separate rendered image pyramids, and may be combined such as at 514 after the above steps in the flow diagram have been performed for each of the specular and diffuse lighting components. In a further example, the sample texture is combined with sampled texture from one or more prior image frames at 714, and may be further processed for display as needed such as adjusting resolution, gamma, or other parameters such as to ensure the rendered image looks as intended on the display hardware.

Selection of pixel textures from a pyramid of successively spatially downsampled images may help reduce the ray tracing rendering noise in each pixel, especially where significant noise remains in at least some pixels after previous processing steps such as rectification of disoccluded pixels in the current rendered image. A trained neural network may be employed to determine the pyramid depth or level of detail and x, y offset for texture sampling, improving the appearance of the texture in the rendered image such as by reducing apparent ray tracing noise.

In some examples, a neural network may comprise a graph comprising nodes to model neurons in a brain. In this context, a "neural network" means an architecture of a processing device defined and/or represented by a graph including nodes to represent neurons that process input signals to generate output signals, and edges connecting the nodes to represent input and/or output signal paths between and/or among neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices including a central processing unit (CPU), graphics processing unit (GPU), digital signal processing (DSP) unit and/or neural processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

In one example embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 8:
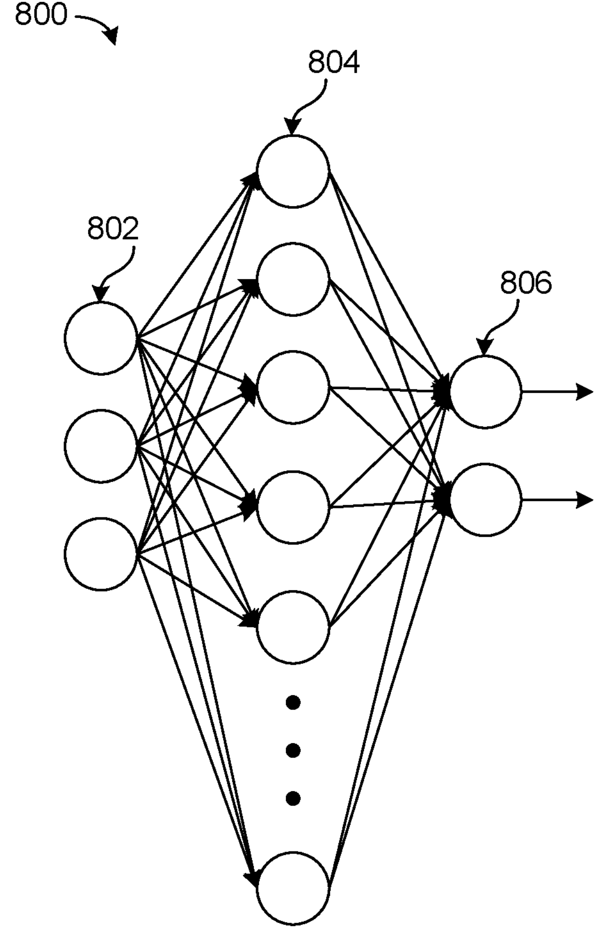
FIG. 8 is a schematic diagram of a neural network, consistent with an example embodiment.

FIG. 8 is a schematic diagram of a neural network 800 formed in "layers" in which an initial layer is formed by nodes 802 and a final layer is formed by nodes 806. All or a portion of features of neural network 800 may be implemented various embodiments of systems described herein. Neural network 800 may include one or more intermediate layers, shown here by intermediate layer of nodes 804. Edges shown between nodes 802 and 804 illustrate signal flow from an initial layer to an intermediate layer. Likewise, edges shown between nodes 804 and 806 illustrate signal flow from an intermediate layer to a final layer. Although FIG. 8 shows each node in a layer connected with each node in a prior or subsequent layer to which the layer is connected, i.e., the nodes are fully connected, other neural networks will not be fully connected but will employ different node connection structures. While neural network 800 shows a single intermediate layer formed by nodes 804, it should be understood that other implementations of a neural network may include multiple intermediate layers formed between an initial layer and a final layer.

According to an embodiment, a node 802, 804 and/or 806 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect.

Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular implementation, an activation output value may be computed and/or generated according to an activation function based on and/or responsive to one or more activation input values received at a node. In a particular implementation, an activation input value and/or activation output value may be structured, dimensioned and/or formatted as "tensors". Thus, in this context, an "activation input tensor" as referred to herein means an expression of one or more activation input values according to a particular structure, dimension and/or format. Likewise in this context, an "activation output tensor" as referred to herein means an expression of one or more activation output values according to a particular structure, dimension and/or format.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ backpropagation techniques to iteratively update neural network weights to be associated with nodes and/or edges of a neural network based, at least in part on "training sets." Such training sets may include training measurements and/or observations to be supplied as input values that are paired with "ground truth" observations or expected outputs. Based on a comparison of such ground truth observations and associated prediction values generated based on such input values in a training process, weights may be updated according to a loss function using backpropagation. The neural networks employed in various examples can be any known or future neural network architecture, including traditional feed-forward neural networks, convolutional neural networks, or other such networks.

Figure 9:
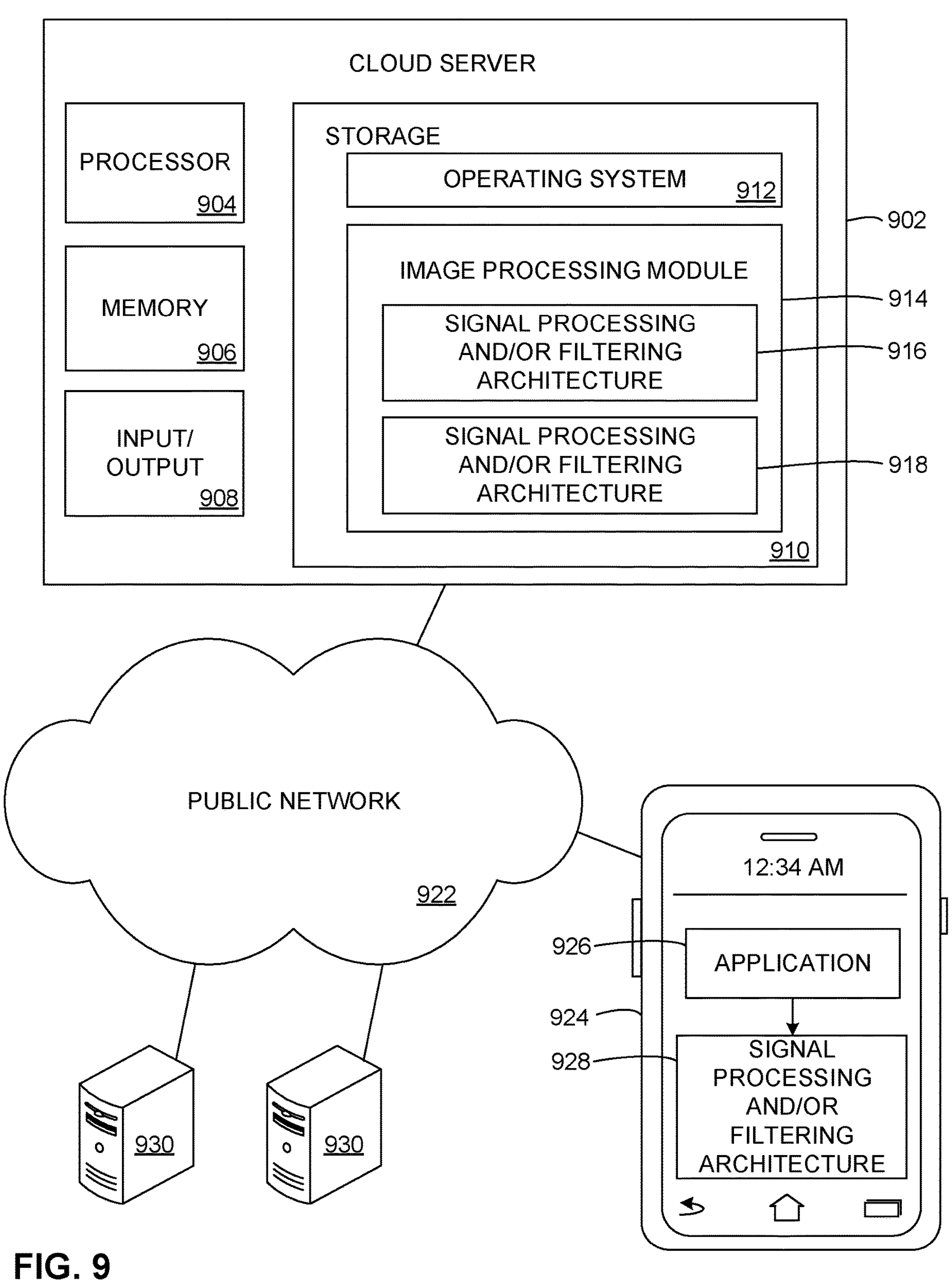
FIG. 9 shows a computing environment in which one or more image processing and/or filtering architectures (e.g., image processing stages, FIG. 1) may be employed, consistent with an example embodiment.

FIG. 9 shows a computing environment in which one or more image processing and/or filtering architectures (e.g., image processing stages, FIG. 1) may be employed, consistent with an example embodiment. Here, a cloud server 902 includes a processor 904 operable to process stored computer instructions, a memory 906 operable to store computer instructions, values, symbols, parameters, etc., for processing on the cloud server, and input/output 908 such as network connections, wireless connections, and connections to accessories such as keyboards and the like. Storage 910 may be nonvolatile, and may store values, parameters, symbols, content, code, etc., such as code for an operating system 912 and code for software such as image processing module 914. Image processing module 914 may comprise multiple signal processing and/or filtering architectures 916 and 918, which may be operable to render and/or process images. Signal processing and/or filtering architectures may be available for processing images or other content stored on a server, or for providing remote service or "cloud" service to remote computers such as computers 930 connected via a public network 922 such as the Internet.

Smartphone 924 may also be coupled to a public network in the example of FIG. 9, and may include an application 926 that utilizes image processing and/or filtering architecture 928 for processing rendered images such as a video game, virtual reality application, or other application 926. Image processing and/or filtering architectures 916, 918, and 928 may provide faster and more efficient computation of effects such as de-noising a ray-traced rendered image in an environment such as a smartphone, and can provide for longer battery life due to reduction in power needed to impart a desired effect and/or compute a result. In some examples, a device such as smartphone 924 may use a dedicated signal processing and/or filtering architecture 928 for some tasks, such as relatively simple image rendering that does not require substantial computational resources or electrical power, and offloads other processing tasks to a signal processing and/or filtering architecture 916 or 918 of cloud server 902 for more complex tasks.

Signal processing and/or filtering architectures 916, 918, and 928 of FIG. 9 may, in some examples, be implemented in software, where various nodes, tensors, and other elements of processing stages (e.g., processing blocks in FIG. 1) may be stored in data structures in a memory such as 906 or storage 910. In other examples, signal processing and/or filtering architectures 916, 918, and 928 may be implemented in hardware, such as a convolutional neural network structure that is embodied within the transistors, resistors, and other elements of an integrated circuit. In an alternate example, signal processing and/or filtering architectures 916, 918 and 928 may be implemented in a combination of hardware and software, such as a neural processing unit (NPU) having software-configurable weights, network size and/or structure, and other such configuration parameters.

Trained neural network 112 (FIG. 1) and other neural networks as described herein in particular examples, may be formed in whole or in part by and/or expressed in transistors and/or lower metal interconnects (not shown) in processes (e.g., front end-of-line and/or back-end-of-line processes) such as processes to form complementary metal oxide semiconductor (CMOS) circuitry. The various blocks, neural networks, and other elements disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Computing devices such as cloud server 902, smartphone 924, and other such devices that may employ signal processing and/or filtering architectures can take many forms and can include many features or functions including those already described and those not described herein.

Figure 10:
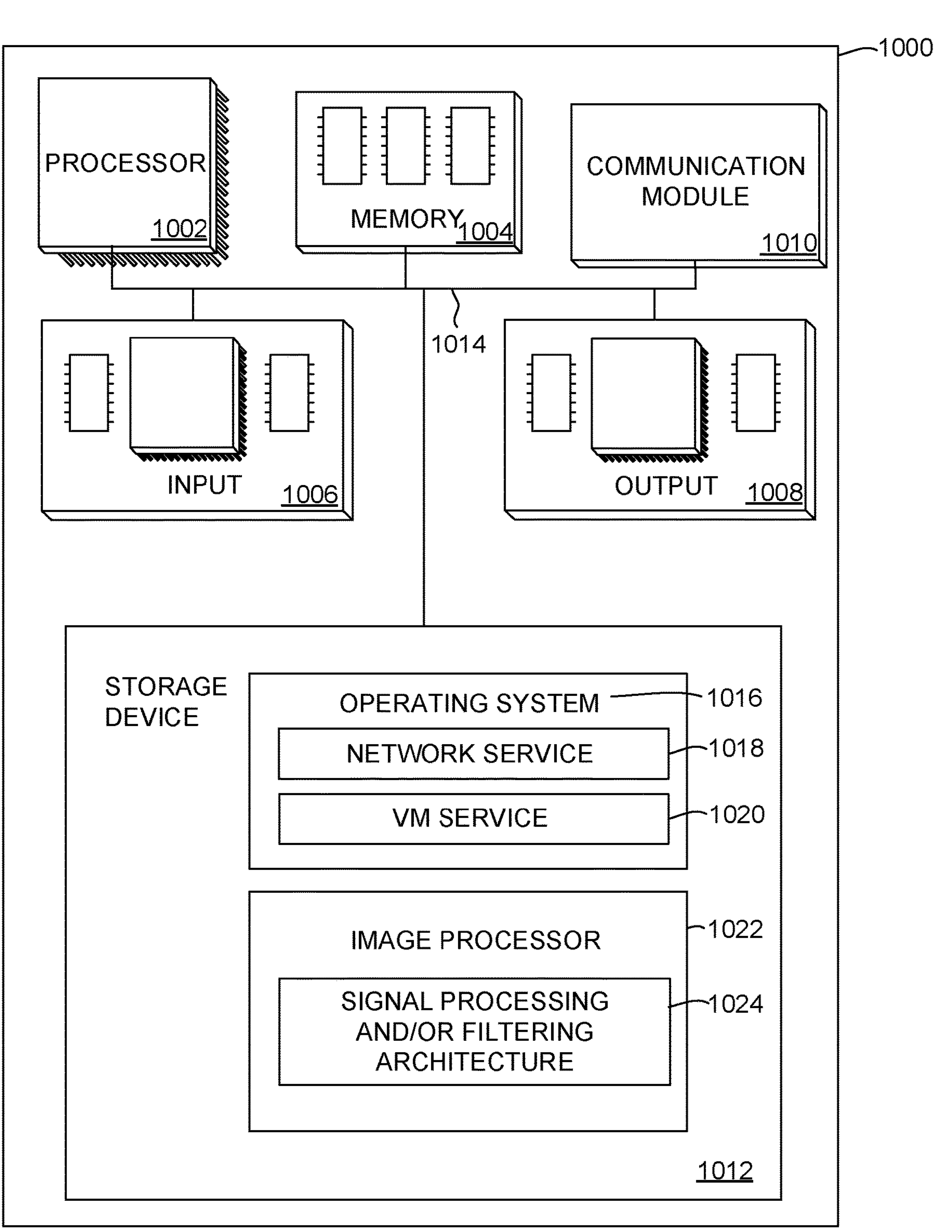
FIG. 10 shows a block diagram of a general-purpose computerized system, consistent with an example embodiment.

FIG. 10 shows a block diagram of a general-purpose computerized system, consistent with an example embodiment. FIG. 10 illustrates only one particular example of computing device 1000, and other computing devices 1000 may be used in other embodiments. Although computing device 1000 is shown as a standalone computing device, computing device 1000 may be any component or system that includes one or more processors or another suitable computing environment for executing software instructions in other examples, and need not include all of the elements shown here.

As shown in the specific example of FIG. 10, computing device 1000 includes one or more processors 1002, memory 1004, one or more input devices 1006, one or more output devices 1008, one or more communication modules 1010, and one or more storage devices 1012. Computing device 1000, in one example, further includes an operating system 1016 executable by computing device 1000. The operating system includes in various examples services such as a network service 1018 and a virtual machine service 1020 such as a virtual server. One or more applications, such as image processor 1022 are also stored on storage device 1012, and are executable by computing device 1000.

Each of components 1002, 1004, 1006, 1008, 1010, and 1012 may be interconnected (physically, communicatively, and/or operatively) for inter-component communications, such as via one or more communications channels 1014. In some examples, communication channels 1014 include a system bus, network connection, inter-processor communication network, or any other channel for communicating data. Applications such as image processor 1022 and operating system 1016 may also communicate information with one another as well as with other components in computing device 1000.

Processors 1002, in one example, are configured to implement functionality and/or process instructions for execution within computing device 1000. For example, processors 1002 may be capable of processing instructions stored in storage device 1012 or memory 1004. Examples of processors 1002 include any one or more of a microprocessor, a controller, a central processing unit (CPU), a graphics processing unit (GPU), a neural processing unit (NPU), an image signal processor (ISP), a digital signal processor (DSP), an application specific integrated circuit (ASIC), a field-programmable gate array (FPGA), or similar discrete or integrated logic circuitry.

One or more storage devices 1012 may be configured to store information within computing device 1000 during operation. Storage device 1012, in some examples, is known as a computer-readable storage medium. In some examples, storage device 1012 comprises temporary memory, meaning that a primary purpose of storage device 1012 is not long-term storage. Storage device 1012 in some examples is a volatile memory, meaning that storage device 1012 does not maintain stored contents when computing device 1000 is turned off. In other examples, data is loaded from storage device 1012 into memory 1004 during operation. Examples of volatile memories include random access memories (RAM), dynamic random access memories (DRAM), static random access memories (SRAM), and other forms of volatile memories known in the art. In some examples, storage device 1012 is used to store program instructions for execution by processors 1002. Storage device 1012 and memory 1004, in various examples, are used by software or applications running on computing device 1000 such as image processor 1022 to temporarily store information during program execution.

Storage device 1012, in some examples, includes one or more computer-readable storage media that may be configured to store larger amounts of information than volatile memory. Storage device 1012 may further be configured for long-term storage of information. In some examples, storage devices 1012 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication modules 1010. Computing device 1000 in one example uses communication module 1010 to communicate with external devices via one or more networks, such as one or more wireless networks. Communication module 1010 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 1000 uses communication module 1010 to wirelessly communicate with an external device such as via public network 922 of FIG. 9.

Computing device 1000 also includes in one example one or more input devices 1006. Input device 1006, in some examples, is configured to receive input from a user through tactile, audio, or video input. Examples of input device 1006 include a touchscreen display, a mouse, a keyboard, a voice responsive system, video camera, microphone or any other type of device for detecting input from a user.

One or more output devices 1008 may also be included in computing device 1000. Output device 1008, in some examples, is configured to provide output to a user using tactile, audio, or video stimuli. Output device 1008, in one example, includes a display, a sound card, a video graphics adapter card, or any other type of device for converting a signal into an appropriate form understandable to humans or machines. Additional examples of output device 1008 include a speaker, a light-emitting diode (LED) display, a liquid crystal display (LCD or OLED), or any other type of device that can generate output to a user.

Computing device 1000 may include operating system 1016. Operating system 816, in some examples, controls the operation of components of computing device 1000, and provides an interface from various applications such as image processor 1022 to components of computing device 1000. For example, operating system 1016, in one example, facilitates the communication of various applications such as image processor 1022 with processors 1002, communication unit 1010, storage device 1012, input device 1006, and output device 1008. Applications such as image processor 1022 may include program instructions and/or data that are executable by computing device 1000. As one example, image processor 1022 may implement a signal processing and/or filtering architecture 1024 to perform image processing tasks or rendered image de-noising tasks such as those described above, which in a further example comprises using signal processing and/or filtering hardware elements such as those described in the above examples. These and other program instructions or modules may include instructions that cause computing device 1000 to perform one or more of the other operations and actions described in the examples presented herein.

Features of example computing devices in FIGS. 9 and 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU), image signal processor (ISP) and/or neural processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 and in the text associated with the foregoing figure(s) of the present patent application.

The term electronic file and/or the term electronic document, as applied herein, refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format).

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or subobjects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A method comprising:

rendering an image frame on rendering instances, the rendered image frame comprising pixel values for one or more lighting components;

maintaining one or more first buffers to store accumulations of pixel values for the one or more lighting components over a plurality of past rendering instances, the accumulations of pixel values lacking processing in one or more spatial filtering and/or processing stages;

maintaining one or more second buffers to store accumulations of pixel values for the one or more lighting components of a rectified image frame, the second buffers comprising one or more biased buffers comprising a history of a plurality of past frames with the one or more spatial filtering and/or processing stages applied, the rectified image frame being based, at least in part, on one or more previously generated output image frames; and combining pixel values in the first one or more buffers with pixel values in the one or more second buffers to provide pixel values for the one or more lighting components in an accumulated image frame.

2. The method of claim 1, wherein combining the pixel values in the first buffers with pixel values in the second buffers further comprises:

applying a first set of blending values to combine pixel values for a first lighting component of the one or more lighting components in at least one of the one or more first buffers with pixel values for the first lighting component in at least one of the one or more second buffers to provide pixel values for the first lighting component in the accumulated image frame; and applying a second set of blending values to combine pixel values for a second lighting component of the one or more lighting components in the at least one of the one or more first buffers with pixel values for the second lighting component in the at least one of the one or more second buffers to provide pixel values for the second lighting component in the accumulated image frame.

3. The method of claim 2, wherein the first and second sets of blending values are based, at least in part, on an output tensor of a neural network.

4. The method of claim 2, wherein the first lighting component comprises a specular lighting component and the second lighting component comprises a diffuse lighting component.

5. The method of claim 1, wherein rendering the image frame on rendering instances comprises rendering by ray tracing.

6. The method of claim 1, wherein at least one of the one or more first buffers comprises an accumulation of pixel values having more noise than the accumulation of pixel values in at least one of the one or more second buffers.

7. The method of claim 1, wherein the combining pixel values in the one or more first buffers with pixel values in the one or more second buffers is biased to include a greater proportion of the one or more first buffers over time as the one or more first buffers accumulate more pixel values of previously rendered frames.

8. The method of claim 1, wherein the accumulated image frame comprises a combination of at least one of the one or more first buffers, at least one of the one or more second buffers, and the rendered image frame and is provided as an output to display.

9. The method of claim 1, further comprising a neural network trained to generate one or more alpha values used when combining the pixel values in the one or more first buffers with pixel values in the one or more second buffers to determine a proportion of pixel values in the one or more first buffers and pixel values in the one or more second buffers.

10. The method of claim 9, wherein the one or more alpha values are determined to provide a corresponding predetermined target level of noise in the accumulated image frame.

11. A computing device, comprising:

a memory comprising one more storage; and one or more processors coupled to the memory, the one or more processors to be operable to:

render an image frame on rendering instances, the rendered image frame comprising pixel values for one or more lighting components;

maintain one or more first buffers in the memory to store accumulations of pixel values for the one or more lighting components over a plurality of past rendering instances, the accumulations of pixel values lacking processing in one or more spatial filtering and/or processing stages;

maintain one or more second buffers in the memory to store accumulations of pixel values for the one or more lighting components of a rectified image frame, the one or more second buffers comprising one or more biased buffers comprising a history of a plurality of past frames with the one or more spatial filtering and/or processing stages applied, the rectified image frame being based, at least in part, on one or more previously generated output image frames; and combine pixel values in the one or more first buffers with pixel values in the one or more second buffers to provide pixel values for the one or more lighting components in an accumulated image frame.

12. The computing device of claim 11, wherein the one or more processors are further operable to combine the pixel values in the first buffers with pixel values in the second buffers based, at least in part, on:

application of a first set of blending values to combine pixel values for a first lighting component of the one or more lighting components in at least one of the one or more first buffers with pixel values for the first lighting component in at least one of the one or more second buffers to provide pixel values for the first lighting component in the accumulated image frame; and application of a second set of blending values to combine pixel values for a second lighting component of the one or more lighting components in the at least one of the one or more first buffers with pixel values for the second lighting component in the at least one of the one or more second buffers to provide pixel values for the second lighting component in the accumulated image frame.

13. The computing device of claim 12, wherein the first and second sets of blending values are based, at least in part, on an output tensor of a neural network.

14. The computing device of claim 12, wherein the first lighting component comprises a specular lighting component and the second lighting component comprises a diffuse lighting component.

15. The computing device of claim 11, wherein the one or more lighting components comprise at least a specular lighting component and a diffuse lighting component.

16. The computing device of claim 11, wherein the one or more processors are further operable to render the image frame on rendering instances based, at least in part, on ray tracing.

17. The computing device of claim 11, wherein at least one of the one or more first buffers comprises an accumulation of pixel values having greater high frequency detail and more noise than the accumulation of pixel values in the at least one of the one or more second buffers.

18. The computing device of claim 11, the one or more processors further operable to implement a neural network trained to generate one or more alpha values to be used to combine the pixel values in the one or more first buffers with pixel values in the one or more second buffers to determine a proportion of pixel values in the one or more first buffers and pixel values in the one or more second buffers.

19. A method of training a neural network, comprising;

receiving an input tensor in an input layer of a neural network, the input tensor representing one or more characteristics of an image frame having one or more lighting components;

providing an output tensor to an output layer of the neural network, the output tensor representing one or more alpha values used when combining pixel values in one or more first buffers that store accumulations of pixel values lacking application of one or more spatial filtering and/or processing stages for the one or more lighting components over a plurality of past rendering instances with pixel values in one or more second buffers store accumulations of pixel values having the one or more spatial filtering and/or processing stages applied for the one or more lighting components of a rectified image frame over a plurality of past rendering instances, the rectified image frame being based, at least in part, on one or more previously generated output image frames, the alpha values used to determine a proportion of pixel values in the first buffers and pixel values in the one or more second buffers while combining pixel values from the one or more first buffers and the one or more second buffers, the output layer of the neural network connected by one or more intermediate layers of the neural network; and training the neural network to predict the provided output tensor based, at least in part, on the received input tensor by using backpropagation to adjust a weight of one or more activation functions linking one or more nodes of one or more layers of the neural network.

* * * * *